United States Patent [19]
Stein et al.

[11] Patent Number: 5,712,866
[45] Date of Patent: Jan. 27, 1998

[54] SMALL LOW POWERED DIGITAL TRANSMITTER FOR COVERT REMOTE SURVEILLANCE

[75] Inventors: Louis E. Stein, Baltimore; Thomas S. Diviney, Pasadena, both of Md.

[73] Assignee: Westinghouse Electric Corporation, Pittsburgh, Pa.

[21] Appl. No.: 503,579

[22] Filed: Jul. 18, 1995

[51] Int. Cl.$^6$ ........................................................ H04B 1/69
[52] U.S. Cl. ................................................. 375/200; 375/206
[58] Field of Search ........................................ 375/206, 200

[56] References Cited

U.S. PATENT DOCUMENTS

| | | | |
|---|---|---|---|
| 4,365,327 | 12/1982 | Pirani | 375/200 |
| 5,208,829 | 5/1993 | Soleimani et al. | 375/207 |
| 5,309,474 | 5/1994 | Gilhousen et al. | 375/206 |
| 5,339,330 | 8/1994 | Mallinckrodt | 375/200 |
| 5,410,568 | 4/1995 | Schilling | 375/206 |
| 5,596,205 | 1/1997 | Reedy et al. | 257/9 |

OTHER PUBLICATIONS

Tecomex letter, Nov. 17, 1991, 3 pages.
Magnavox publication, Low probability of detection communications, Stealth–Comm., 15 pages.
Magnanov publication, Handheld Low Probability of Detection Transceiver, 2 pages.
Phoebus Radio Inc. publication, Spread Spectrum Covert Radio, 4 pages.

*Primary Examiner*—Stephen Chin
*Assistant Examiner*—Jeffrey W. Glack

[57] ABSTRACT

A small low power portable transmitter for remote covert surveillance is disclosed. The transmitter includes a scrambler, forward error correction encoder, differential encoder, spread spectrum system and a modulator. The transmitter may be configured to transmit a single input signal or multiple input signals. The transmitter is powered by a portable single voltage power supply. All digital components of the transmitter may be implemented in a field programmable gate array and the transmitter may be easily modified to accommodate different applications.

18 Claims, 4 Drawing Sheets

SMALL LOW POWERED DIGITAL TRANSMITTER FOR COVERT REMOTE SURVEILLANCE

BACKGROUND OF THE INVENTION

1. Field of the Invention

This invention relates to transmitters and, more particularly, to small, lightweight, battery operated transmitters for use in law enforcement and other covert applications.

2. Description of the Prior Art

Small transmitters have played an important role in numerous law enforcement applications for many years. These applications include covert audio and video monitors, tracking of personnel or objects, and short range communication.

These applications have generally been served by narrow band frequency-modulated (FM) analog transmitters. While these transmitters provide a simple communication channel, they are not easily adaptable to provide scrambling, error correction, phase-shift keying modulation or spread spectrum communication. Furthermore, narrow band FM analog transmitters are easily detected and monitored by conventional scanning receivers. Known transmitters in the art which provide scrambling, forward error correction, differential encoding, band spreading and phase-shift keying modulation are large in size and require ample amounts of power and are therefore not suitable for covert surveillance.

Therefore, it is the object of the invention to provide a small, lightweight, inexpensive and low power transmitter which has good voice quality and near real time video. It is a further object of the invention to provide a transmitter which utilizes digital signal processing while satisfying power and size constraints of existing analog transmitters. It is an additional object of the invention to provide a transmitter which may be easily configured for different applications as well as transmission of a variety of signals.

SUMMARY OF THE INVENTION

The invention provides for a small low power portable transmitter for covert remote surveillance. The transmitter includes at least one input device for converting at least one input signal into at least one electric signal. The electric signal is digitized and scrambled according to a known scheme. The transmitter additionally includes a forward error correction encoder for adding systematic redundancy to the electric signal and a differential encoder for defeating phase instability in the electric signal and transmitted signal. The transmitter also includes a spread spectrum system for making the electric signal covert and reducing the effect of interference, and a modulator for superimposing the electric signal onto a carrier frequency.

The entire low power portable transmitter is contained within a compact housing and the scrambler, forward error correction encoder, differential encoder, and spread spectrum system may be implemented in a field programmable gate array. In addition, the entire transmitter may be powered for several hours by a single portable low voltage power source.

BRIEF DESCRIPTION OF THE DRAWINGS

The invention will be more readily apparent to those skilled in the art by reference to the accompanying drawings wherein.

DETAILED DESCRIPTION OF THE PREFERRED EMBODIMENTS

This invention provides a small low power portable transmitter for covert remote surveillance. In general, the input signal is digitized into a continuous bit stream and scrambled and applied to a differential encoder. The differential encoder defeats phase instability in the electric signal and transmitted signal and thereby improves the reception thereof. The signal is bandspread and transmitted at a chosen radio frequency. All components in the transmitter are powered by a single voltage and the transmitter will operate for several hours on a single portable power supply.

Figure 1:
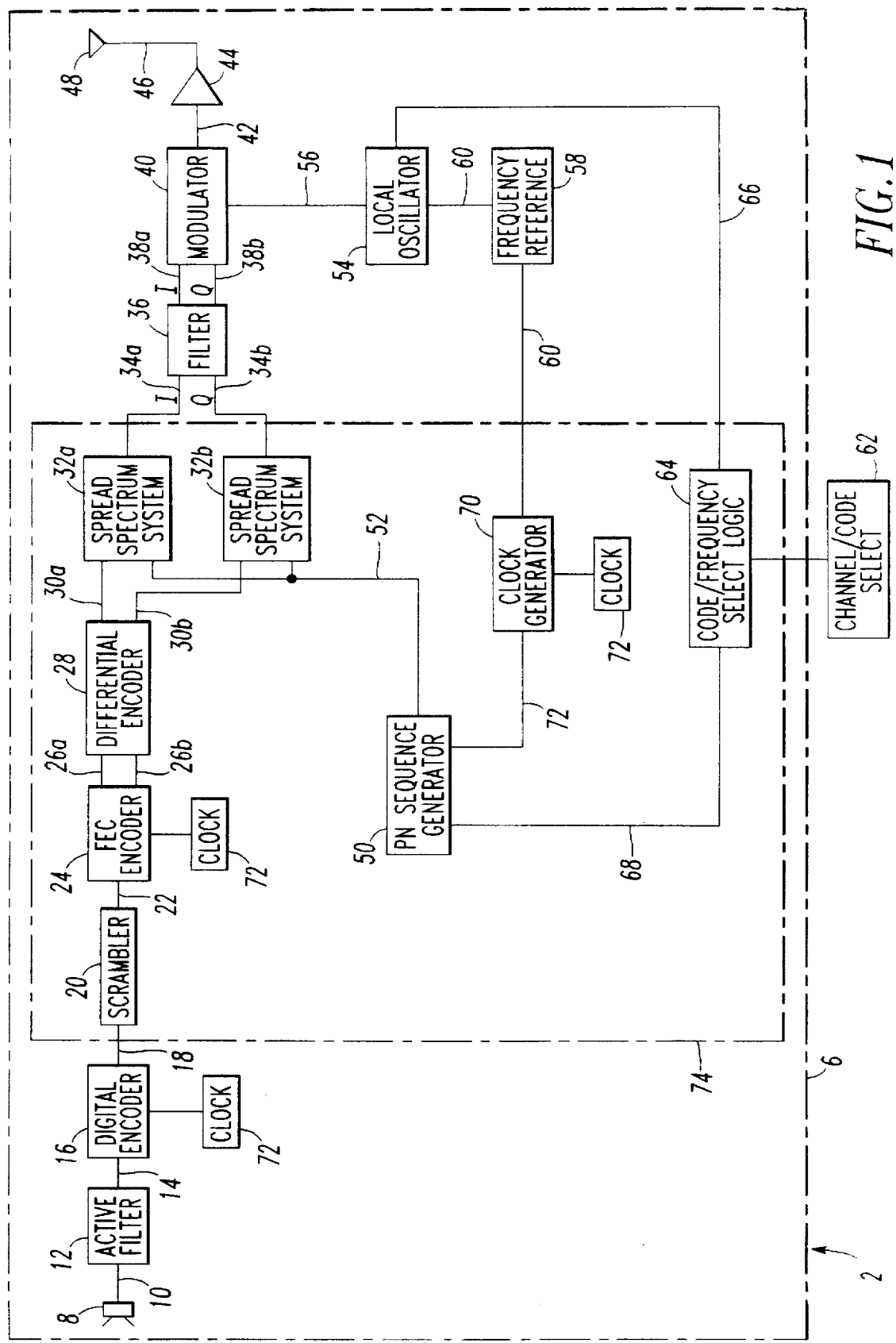
FIG. 1 is a functional block diagram of an embodiment of a low powered transmitter according to the invention wherein the transmitter has a single audio channel.

FIG. 1 is a functional block diagram of a first embodiment of the transmitter 2 according to the invention. An input device 8 such as an electret microphone converts an input signal into an electric signal 10 which is amplified and conditioned by an active filter 12. The active filter 12 provides gain and bandlimiting and the output conditioned signal 14 is digitized by a digital encoder 16. The digital encoder 16 is preferably a Continuously Variable Slope Delta (CVSD) encoder which provides a continuous output bit stream and eliminates the need for message framing and synchronization.

The digital signal 18 is next scrambled by a scrambler 20. The scrambler 20 may be formed as an 11 bit linear shift register and an exclusive OR gate. The digital signal 18 is scrambled to ensure that the audio signals on the transmitted signal 46 are not detectable by conventional receivers.

The scrambled signal 22 is applied to a forward error correction encoder 24 wherein two output bits are generated for every input bit. Applying forward error correction to the scrambled signal 22 adds systematic redundancy to the data signal and permits any errors in the transmitted signal 46 to be detected and corrected by a receiver 99. The forward error correction encoder 24 is preferably a convolutional encoder of rate ½ and two forward error correction encoded signals 26a, 26b are clocked at 64 kilobits per second (kbps) if the scrambled signal 22 is clocked at 64 kbps.

Figure 2:
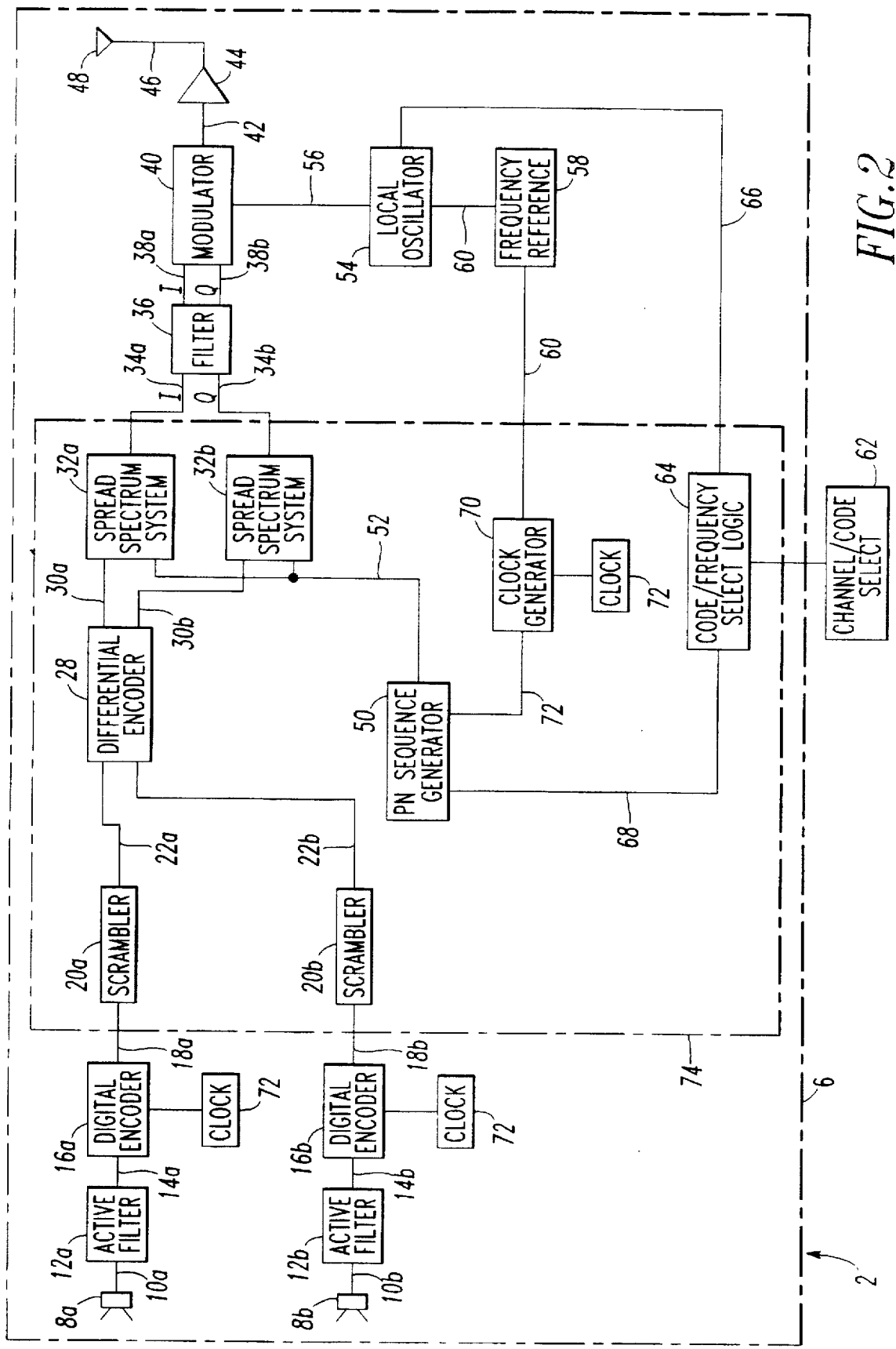
FIG. 2 is a functional block diagram of an embodiment of the invention wherein the transmitter has two audio channels.

A differential encoder 28 applies coding to the forward error correction encoded signals 26a, 26b which enables the receiver 99 to look for changes in the phase of the transmitted signal 46. Therefore, the need for phase stability and phase-lock loop architecture in the receiver 99 is obviated. The differential encoding of the data signal additionally permits two channels to be simultaneously transmitted as shown in FIG. 2.

The two differentially encoded signals 30a, 30b are bandspread by a spread spectrum system 32a, 32b. The spread spectrum system is preferably a Direct Sequence Spread Spectrum (DSSS) system. Bandspreading the data signal creates a favorable Low Probability of Intercept (LPI) and provides immunity against interference. The spread spectrum system 32a, 32b multiplies the differentially encoded signals 30a, 30b by codes generated by a pseudorandom noise (PN) sequence generator 50. The generated codes may be Gold codes, M-sequences or Barker sequences or any other codes known in the art.

The bandspread signals 34a, 34b are baseband filtered by a filter 36 to reduce frequency side lobes in the transmitted signal 46 and the output filtered signals 38a, 38b are applied to a modulator 40. The modulator 40 is configured to provide Binary Phase-Shift Keying (BPSK) or Quarternary Phase-Shift Keying (QPSK) modulation. The modulator 40 superimposes the filtered signals 38a, 38b onto a carrier signal 56 to form either a BPSK or QPSK modulated radio frequency (RF) signal 42. The modulated RF signal 42 is amplified by an amplifier 44 to produce the transmitted signal 46 which is broadcast via an integral antenna 48.

The transmitter 2 includes code/frequency select logic 64 which allows the user of the transmitter 2 to select one of several carrier frequencies. The user chooses a desired carrier signal 56 via a channel/code select 62 and the code/frequency select logic 64 generates a frequency logic signal 66 which instructs a local oscillator 54 to produce the chosen carrier signal 56.

The user may additionally choose one of a variety of codes to be utilized by the spread spectrum system 32a, 32b for bandspreading the differentially encoded signals 30a, 30b. The user chooses a code via the channel/code select 62 and the code/frequency select logic 64 generates a code logic signal 68 which instructs the PN sequence generator 50 to generate the desired code signal 52.

The transmitter 2 utilizes a frequency reference 58 for establishing a common frequency signal 60 and synchronizing the entire transmitter 2.

As shown in FIG. 1, the scrambler 20, forward error correction encoder 24, differential encoder 28, spread spectrum system 32a, 32b, PN sequence generator 50, clock generator 70 and code/frequency select logic 64 are implemented in a programmable logic device 74. The use of a programmable logic device 74 minimizes the size and power consumption of the transmitter 2.

A field programmable gate array (FPGA) may preferably be utilized as the programmable logic device 74 because the FPGA allows the transmitter 2 to be tailorable to numerous applications without extensive alterations to the circuit board. For example, the transmitter 2 may be easily configured to provide for the transmission of one audio signal, stereo audio, and audio and video signals. Furthermore, the transmitter 2 may be easily altered to reconfigure or selectively remove the scrambling, forward error correction, differential encoding or band spreading functions through the use of the programmable logic device 74.

The chart below contains a list of components which may be used to construct the transmitter 2 shown in FIG. 1:

| Reference Number | Part Description | Part No. | Supplier |
|---|---|---|---|
| 12 | OP-AMP | LM324AD | MOTOROLA |
| 16 | CVSD ENCODER | HC9-55564-5 | HARRIS |
| 40 | MODULATOR | RF2402 | RF DEVICES |
| 44 | POWER AMP | RF2103 | RF DEVICES |
| 54 | SYNTHESIZER | UMA1016BT | PHILLIPS |
| 54 | VCO | MC12148D | MOTOROLA |
| 58 | 8MHz CRYSTAL | ECS-80-S-7B | ECS |

-continued

| Reference Number | Part Description | Part No. | Supplier |
|---|---|---|---|
| 74 | FIELD PROGRAMMABLE GATE ARRAY | A1020B-PL44C | ACTEL |

The transmitter 2 may be powered for several hours by a single portable power supply such as a 7K67 battery. The transmitter 2 is operated by a voltage between 3.5 and 6 volts and the transmitter output power is approximately 100 mW.

The transmitter 2 according to the invention is ideal for use in covert applications because of the small size of the transmitter 2. The entire transmitter 2, including the power supply and integral antenna 48, may be implemented in a housing 6 which is 2.5 inches (6.35 cm) long by 1.6 inches (4.06 cm) wide and 0.625 inches (1.59 cm) thick.

Figure 3:
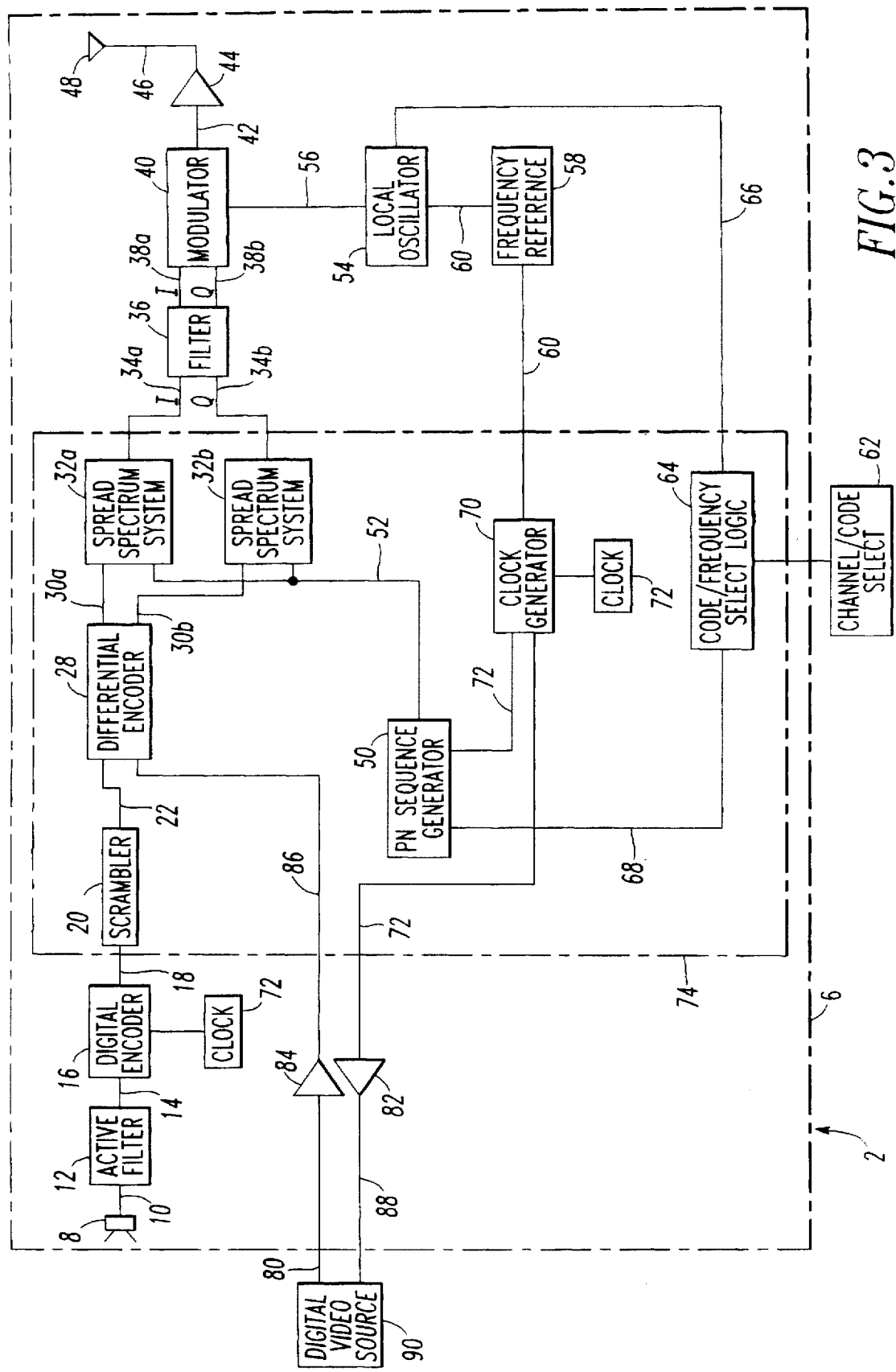
FIG. 3 is a functional block diagram of an embodiment of the invention wherein the transmitter has a single audio channel and a single video channel.

The transmitter 2 may alternatively transmit multiple channels. Two embodiments of multiple channel transmitters are shown in FIG. 2 and FIG. 3. FIG. 2 is a functional block diagram of a second embodiment of the transmitter 2 having two audio channels. A first audio signal is converted by a first input device 8a into a first electric signal 10a which is amplified and conditioned by a first active filter 12a. The first conditioned signal 14a is digitized by a first digital encoder 16a and the first digital signal 18a is scrambled via a first scrambler 20a to produce a first scrambled signal 22a.

A second audio signal is converted by a second input device 8b into a second electric signal 10b which is amplified and conditioned by a second active filter 12b. The second conditioned signal 14b is digitized by a second digital encoder 16b and the second digital signal 18b is scrambled via a second scrambler 20b to produce a second scrambled signal 22b.

The first scrambled signal 22a and the second scrambled signal 22b are differentially encoded in the differential encoder 28 as described in the previous embodiment. The differentially encoded signals 30a, 30b are bandspread by the spread spectrum system 32a, 32b and baseband filtered in the filter 36. The filtered signals 38a, 38b are superimposed on the carrier signal 56 by the modulator 40 and subsequently amplified by the amplifier 44 to produce a transmitted signal 46 which is broadcast via the integral antenna 48.

A block diagram of a third embodiment of the transmitter 2 is shown in FIG. 3. This embodiment of the transmitter 2 has an audio channel and a video channel. The first input signal is an audio signal which is converted by an input device 8 into an electric signal 10. The electric signal 10 is conditioned, digitized, and scrambled in the same manner described in the first and second embodiments to produce a scrambled signal 22.

The second input signal in this embodiment is a digital video signal 80. A clock 72 from the clock generator 70 is applied to a first buffering amplifier 82 and the buffered clock 88 is connected to a digital video source 90 for synchronizing the digital video source 90 with the transmitter 2. The incoming digital video signal 80 is buffered by a second buffering amplifier 84 to produce a buffered video signal 86. The buffered video signal 86 is differentially encoded with the scrambled signal 22 in the differential encoder 28. The differentially encoded signals 30a, 30b are bandspread by the spread spectrum system 32a, 32b and baseband filtered in the filter 36.

The filtered signals 38a, 38b are superimposed on the carrier signal 56 by the modulator 40 and amplified by the amplifier 44 to produce a transmitted signal 46 which is broadcast via the integral antenna 48 as discussed in the previous embodiments.

The embodiments of the transmitter 2 shown in FIG. 2 and FIG. 3 may further include error correction. In addition, the transmitter 2 is not limited to the transmission of audio and video signals inasmuch as the input device 8 may alternatively include an infrared sensor or other auxiliary sensor.

Memory may additionally be added to the transmitter 2 to provide for the transmission of data to the receiver 99 in burst mode. The transmitted signal 46 may also include addressing to direct communications to a particular receiver or identify a particular transmitter.

Figure 4:
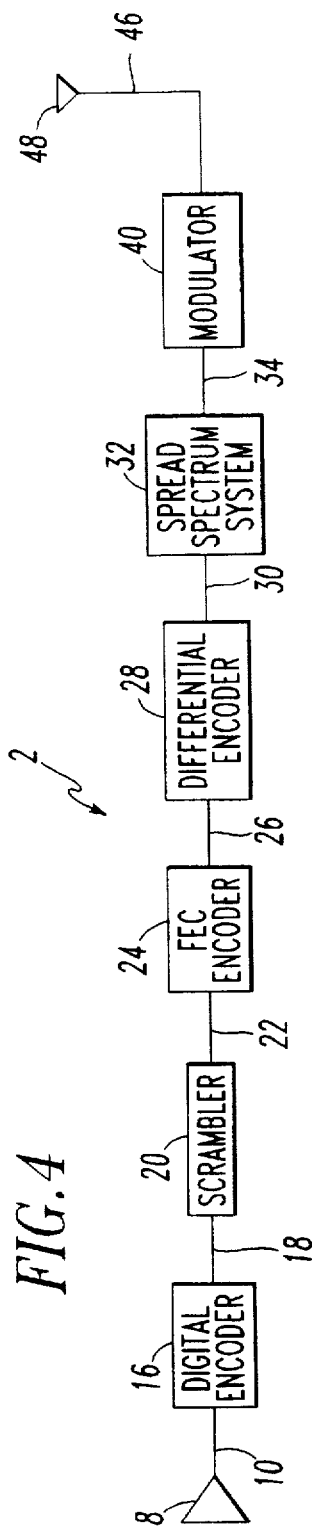
FIG. 4 is a functional block diagram of the transmitter according to the invention.

FIG. 4 is a general block diagram of one embodiment of the transmitter according to the invention wherein the input device 8 converts an input signal into an electric signal 10. The electric signal 10 is subsequently digitized in the digital encoder 16 and scrambled in scrambler 20. The scrambled signal 22 is applied to the forward error correction encoder 24 to produce the forward error correction encoded signals 26 which are applied to the differential encoder 28. The differentially encoded signals 30 are applied to the spread spectrum system 32 to produce the bandspread signals 34. The bandspread signals 34 are applied to the modulator 40 to produce the transmitted signal 46 which is emitted via the integral antenna 48.

Figure 5:
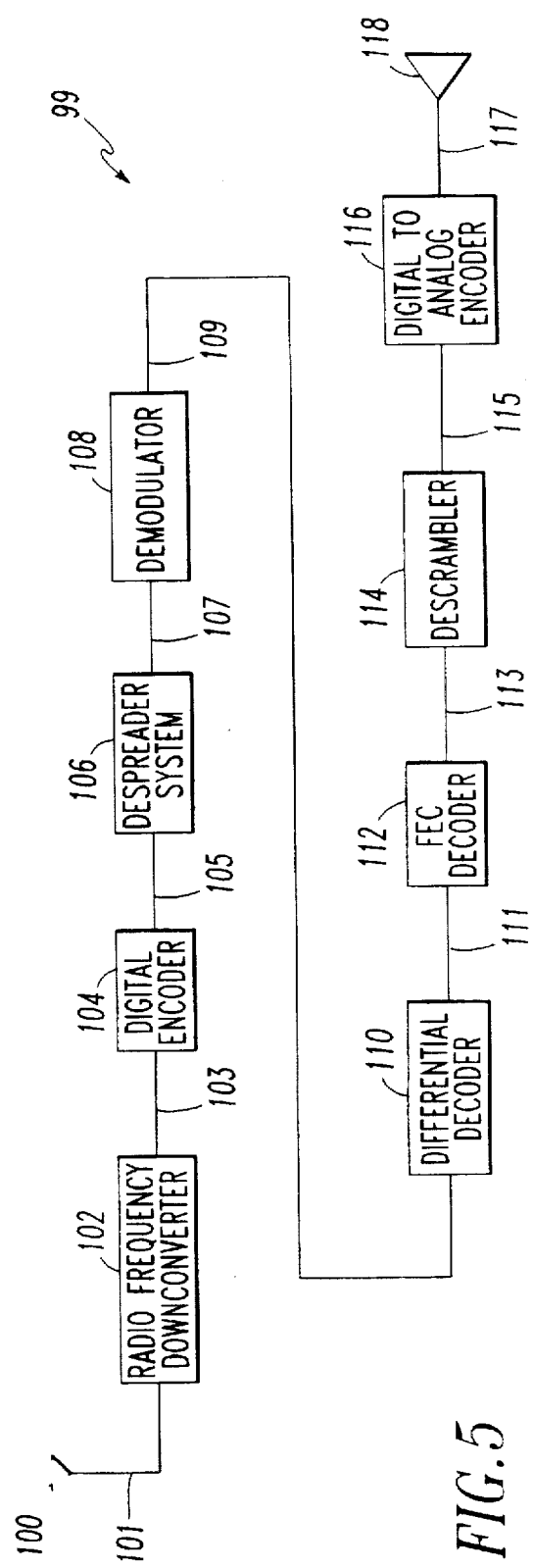
FIG. 5 is a functional block diagram of a receiver which corresponds to the transmitter shown in FIG. 4.

FIG. 5 is a functional block diagram of a receiver 99 which may be utilized to receive the transmitted signal 46 emitted from the transmitter 2 shown in FIG. 4. In particular, the transmitted signal 46 is received by a receiver antenna 100 and converted into a received electric signal 101. The received electric signal 101 is conditioned and converted to a baseband signal 103 by a radio frequency downconverter 102.

The baseband signal 103 is digitally encoded by a third digital encoder 104 thereby producing a digital baseband signal 105. The digital baseband signal 105 is applied to a despreader system 106 which removes the spreading code and reduces the signal bandwidth to the bandwidth of the forward error correction encoded information and provides interference rejection.

A despread signal 107 from the despreader system 106 is applied to a demodulator 108. The phase modulation on the despread signal 107 is converted to amplitude by the demodulator 108 and a demodulated signal 109 is thereby produced. The demodulated signal 109 is applied to a differential decoder 110 which produces a decoded signal 111 and the decoded signal 111 is a reconstruction of the forward error correction encoded signals 26 shown in FIG. 4.

The decoded signal 111 is processed by a forward error correction decoder 112 which detects and corrects digital bit errors caused by noise and distortion in the propagation medium and the forward error correction decoder 112 outputs an error corrected signal 113. The error corrected signal 113 is rendered intelligible by a descrambler 114. A descrambler output signal 115 is reconverted to the original analog format by a digital to analog encoder 116. An analog signal 117 is applied to an output device 118 which produces the output signal.

Although certain preferred embodiments have been described and shown herein, it is to be understood that various other embodiments and modifications can be made within the scope of the following claims.

What is claimed is:

1. A low power portable transmitter for transmitting data signals, comprising:

a. a first input device for converting a first input signal into a first electric signal;

b. a spread spectrum system for increasing the bandwidth of the first electric signal and providing immunity against interference and interception and said spread spectrum system being connected to said first input device; and c. a modulator for superimposing the spread first electric signal onto a carrier signal for the transmission of the first electric signal and said modulator being connected to said spread spectrum system;

wherein said spread spectrum system is implemented in a programmable logic device.

2. The low power portable transmitter of claim 1 further comprising a scrambler for disarranging the first electric signal according to a known scheme and said scrambler being interposed between said first input device and said spread spectrum system.

3. The low power portable transmitter of claim 2 further comprising:

a. a forward error correction encoder for imposing a code onto the scrambled first electric signal and permitting the detection and correction of errors therein and said forward error correction encoder being connected to said scrambler; and b. a differential encoder for defeating phase instability in the first electric signal and improving the reception of the first electric signal in a receiver and said differential encoder being interposed between said forward error correction encoder and said spread spectrum system.

4. The low power portable transmitter of claim 3 further comprising a second input device for converting a second input signal into a second electric signal and the second electric signal being applied to said differential encoder.

5. The low power portable transmitter of claim 3 wherein said programmable logic device is a field programmable gate array.

6. The low power portable transmitter of claim 5 wherein said first input device and said scrambler and said forward error correction encoder and said differential encoder and said spread spectrum system and said modulator are implemented in a single housing having dimensions not exceeding 2.5 inches by 1.6 inches and 0.625 inches.

7. The low power portable transmitter of claim 5 wherein said low power transmitter is fabricated of semiconductor material mounted upon dielectric substrates.

8. The low power portable transmitter of claim 5 wherein said scrambler and said forward error correction encoder and said differential encoder and said spread spectrum system and said modulator are powered by a portable single voltage power supply.

9. The low power portable transmitter of claim 5 wherein said scrambler and said forward error correction encoder and said differential encoder and said spread spectrum system and said modulator are implemented in a single housing having dimensions not exceeding 2.5 inches by 1.6 inches and 0.625 inches and powered by a portable single voltage power supply and fabricated of semiconductor material mounted upon dielectric substrates.

10. The low power portable transmitter of claim 1 further comprising a forward error correction encoder for imposing a code onto the first electric signal and permitting the detection and correction of errors therein and said forward error correction encoder being interposed between said first input device and said spread spectrum system.

11. The low power portable transmitter of claim 1 further comprising a differential encoder for defeating phase instability in the first electric signal and improving the reception of the first electric signal in a receiver and said differential encoder being interposed between said first input device and said spread spectrum system.

12. The low power portable transmitter of claim 11 further comprising a second input device for converting a second input signal into a second electric signal and the second electric signal being applied to said differential encoder.

13. The low power portable transmitter of claim 1 wherein said programmable logic device is a field programmable gate array.

14. The low power portable transmitter of claim 1 wherein said first input device and said spread spectrum system and said modulator are implemented in a single housing having dimensions not exceeding 2.5 inches by 1.6 inches and 0.625 inches.

15. The low power portable transmitter of claim 1 wherein said low power portable transmitter is fabricated of semiconductor material mounted upon dielectric substrates.

16. The low power portable transmitter of claim 1 wherein said spread spectrum system and said modulator are powered by a portable single voltage power supply.

17. A method of transmitting a data signal, comprising:
   a. converting an input signal into an electric signal;
   b. disarranging the electric signal according to a known scheme;
   c. adding systematic redundancy to the disarranged electric signal with said adding being performed in a programmable logic device;
   d. encoding the redundant electric signal with said encoding being performed in said programmable logic device;
   e. spreading the bandwidth of the encoded electric signal with said spreading being performed in said programmable logic device; and
   f. modulating a carrier signal with the spread electric signal for the transmission of the electric signal.

18. The method of claim 17 wherein said programmable logic device is a field programmable gate array.

* * * * *